July 19, 1932.  C. F. WALL  1,868,450
NOSE GRIP FOR EYEGLASSES
Filed Jan. 15, 1929

Inventor
Charles F. Wall
By Cyrus N. Anderson
Attorney

Patented July 19, 1932

1,868,450

UNITED STATES PATENT OFFICE

CHARLES F. WALL, OF DREXEL HILL, PENNSYLVANIA, ASSIGNOR TO WALL & OCHS, INCORPORATED, OF PHILADELPHIA, PENNSYLVANIA, A CORPORATION OF PENNSYLVANIA

NOSE GRIP FOR EYEGLASSES

Application filed January 15, 1929. Serial No. 332,632.

My invention relates to nose grips for eye glasses and it has for its general object to provide a novel construction of nose grip having means whereby the same may be adjusted with greater facility and will retain its adjustments better than has hitherto been practicable.

More specifically it is the object of my invention to provide an improved construction of means for supporting the nose grips whereby the nose-bearing parts thereof may be readily adjusted to fit the nose of the wearer of the eyeglasses, and whereby the angular relation of the nose grips with respect to the plane of the lenses of the eyeglasses may be varied.

Other objects and advantages of my invention will be pointed out in the detailed description thereof which follows or will become apparent from such description.

In order that the invention may be readily understood and its manifold practical advantages appreciated, reference may be had to the accompanying drawing in which I have illustrated one form of a convenient embodiment thereof. However, it will be understood that the invention is susceptible of embodiment in other forms of construction than that shown, and various changes may be made in the details of construction without departing from the scope of the invention as defined in the claims.

Figure 1:
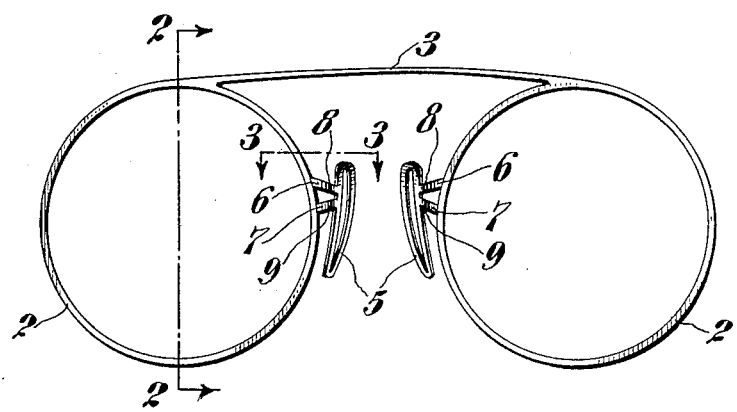
Fig. 1 is a view in rear elevation of an eyeglass frame provided with nose grips embodying my invention.
Figure 4:
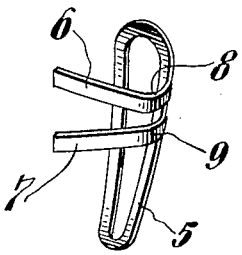
Fig. 4 is a view in perspective of one of the nose grips shown in Fig. 1.
Figure 2:
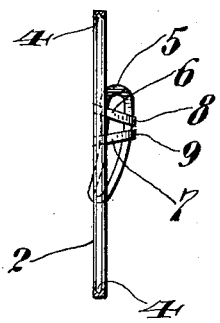
Fig. 2 is a view in vertical sectional elevation taken on the line 2—2 of Fig. 1.
Figure 3:
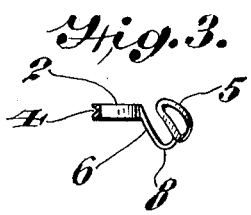
Fig. 3 is a view in horizontal section taken on the line 3—3 of Fig. 1 and showing one of the nose grips in top plan.

Referring to the drawing, it will be noted that I have provided an eyeglass frame which consists preferably of metal, having rims 2 which are connected together by means of a flexible spring bridge 3. The rims 2 have grooves upon their inner sides, as indicated at 4, for engaging the edges of the lenses and retaining the same within the rims. The lenses are not shown. The rims preferably are endless, as illustrated, the lenses being mounted therein by causing the said rims to stretch sufficiently to receive and hold the said lenses.

Each nose grip of the eyeglasses comprises a substantially elliptical nose-bearing part 5 and arms 6 and 7 the forward ends of which are connected, in the construction shown, directly to one of the rims 2. The inner end portions of the said arms are bent inwardly and slightly forwardly, as indicated at 8 and 9, and are connected to the rear edge of the nose grip, the points of such connection being spaced from each other, as shown. The said arms 6 and 7 diverge from their points of connection to the rear edge of the nose grip to their points of connection to the rim 2, to which they may be connected. Preferably the arms 6 and 7 are integral with the nose grip 5 and are connected to the rear edge of the latter at points nearer to the upper end than to the lower end thereof, thus producing a frame which is integral, even though the arms are brazed to the rim. Although the description relative to the nose grips has been directed to a single grip it will be understood that each pair of eyeglasses is provided, as illustrated, with two nose grips.

By providing two arms 6 and 7 for supporting the respective nose-bearing parts, which are spaced from and divergently related to each other as shown, I am enabled by the use of a relatively small amount of metal to rigidly and firmly support the nose-bearing parts in any position to which they may be adjusted.

The employment of two arms for supporting the respective nose-bearing parts enables more ready adjustment of the nose-bearing parts than otherwise could be effected. By bending both arms of the support for the respective nose-bearing parts, the said respective parts may be adjusted as a whole to vary their relation with respect to the eyeglass rims and the lenses carried thereby without changing the relation of one end portion of the bearing part to the other end portion thereof. However, if it should be desired to adjust one end portion of a nose-bearing part without altering the position of the other end portion thereof, such adjustment may be effected by varying the curvature of the bend of the arm 6 or 7, depending upon whether it be desired to adjust the upper end portion of the bearing part or the lower end portion thereof. It will be noted that the points of connection of the rear ends of the arms 6 and 7 to the rear edges of the respective nose-bearing parts are spaced far enough from each other to permit bending of the portion of the nose-bearing part between the said points of connection. Such relationship facilitates the independent adjustment of the opposite end portions of the respective nose-bearing parts.

The nose-bearing parts of the nose grips are held in gripping engagement with the nose of a wearer by the action of the flexible spring bridge 3.

Having thus described my invention, what I claim and desire to secure by Letters Patent is:

1. A pair of eyeglasses, comprising lens-receiving rims, a bridge directly connecting said rims, and nose gripping members directly secured to said rims below the points of attachment of the bridge to said rims, each nose gripping member comprising an approximately elliptical nose-bearing part and a pair of arms integrally connected directly and permanently with the rear edge of the nose-bearing part and with the respective rim, the arms of each pair diverging from the nose bearing parts to the respective rims, and being adjustable by bending them simultaneously or independently to adjust the nose bearing parts and the rims to fit the wearer.

2. A pair of eyeglasses, comprising lens receiving rims, a flexible bridge connecting the upper edges of the rims, nose gripping members, and a pair of arms unitary with each nose gripping member and directly connecting the same at the rear edge thereof with the inner edge of its respective rim, the arms of each pair being spaced from each other throughout their length and diverging slightly from the nose gripping member to the rim.

In testimony that I claim the foregoing as my invention I have hereunto signed my name this 14th day of January, A. D. 1929.

CHARLES F. WALL.